United States Patent Office 2,982,394
Patented May 2, 1961

2,982,394
SOIL CONDITIONING PACKAGE

Leo J. Novak, Dayton, Ohio, assignor to The Commonwealth Engineering Company of Ohio, Dayton, Ohio, a corporation of Ohio No Drawing. Filed July 13, 1955, Ser. No. 521,898

2 Claims. (Cl. 206—46)

This invention relates to water-soluble films and more particularly to such films formed from carboxymethyl dextran and water-soluble salts thereof.

Many types of plastic films are known in the art. In the prior art, the emphasis has been placed on water-insoluble films, such as those of the vinyl resins, polyethylene, etc., and adapted to be used under conditions requiring resistance to water. A vast amount of research has been directed to improving the water-resistance of films formed from water-sensitive materials, such as cellophane.

Although the art has been largely preoccupied with films which are inherently water-resistant or the moisture-proofing of naturally hydrophilic films, there are various uses for which a water-soluble film would be desirable. For example, it is desirable to package in a water-soluble film such materials as detergents, soap, soup concentrates, sugar, dehydrated food products including tea and coffee concentrates, certain pharmaceutical preparations and other materials intended to be added to a fixed quantity of water, so that the packaged material can be added, without removal of the film, to the water required to prepare a solution or dispersion of the desired concentration.

Water-soluble films of gelatin and other natural materials have been available but lack strength especially when the film is as thin as is desirable for most packaging purposes. Water-soluble cellulose derivatives such as water-soluble methyl cellulose and water-soluble salts of carboxymethyl cellulose have been proposed. Films of such cellulose derivatives as water-soluble methyl cellulose are known to be brittle even when modified with available plasticizers. Films of water-soluble salts of carboxymethyl cellulose may be more satisfactory so far as pliability and strength are concerned but are comparatively expensive since the salt obtained as initial product in the carboxymethylating reaction normally contains impurities, principally alkali metal chloride, which crystallize in the film and not only contribute haziness to the films but decreases the strength thereof. These impurities are therefore removed by isolating the free ether from the salt and then re-converting the etther to the salt.

An object of this invention is to provide new water-soluble films having acceptable plasticity and strength for general packaging purposes and which, being derived from a microbiologically produced parent material, are relatively inexpensive as compared to films of the alkali metal salts of carboxymethyl cellulose.

These and other objects which will become apparent hereinafter are achieved by this invention which provides plastic films of good physical properties and formed from carboxymethyl dextran or an alkali metal salt thereof having associated therewith a compatible plasticizing or softening agent.

The production of carboxymethyl dextran is described in the pending application of L. J. Novak et al., Serial No. 346,016, filed March 31, 1953, now abandoned. In brief, the dextran and carboxymethylating agent are reacted together in an aqueous alkaline medium whereby the carboxymethyl group is substituted for hydroxyl groups in the dextran molecule. Suitable carboxymethylating agents are chloracetic acid, sodium chloracetate, or chloracetamide. The reaction is carried out in an aqueous solution of a strong alkali metal hydroxide such as sodium, potassium or lithium hydroxide. Preferably, the dextran is reacted in aqueous solution or suspension with an excess of sodium or potassium chloracetate in the presence of an excess of sodium or potassium hydroxide at 50° C. to 100° C. for ten minutes to two hours. Also preferably, the molar ratio of sodium chloracetate or potassium chloracetate to dextran is between 2:1 and 12:1, the molar ratio of sodium or potassium hydroxide to dextran is between 5:1 and 15:1, and the molar ratio of water to dextran is between 70:1 and 120:1. The carboxymethyl dextran obtained under these conditions may have a D.S. (degree of substitution or average number of carboxymethyl groups per anhydroglucopyranosidic unit) of less than 1.0, say 0.5, to 3.0.

The initial reaction product is a viscous mass comprising the sodium or potassium salt of the carboxymethyl dextran. The salt can be precipitated in essentially pure condition from the crude reaction mass by the addition of any water-miscible alcohol or ketone such as methyl, ethyl, propyl, isopropyl or t.butyl alcohol or acetone, washed free of the precipitant, and dried, after which it may be formed into a clear film.

If it is desired to provide a water-soluble film comprising the free carboxymethyl ether, the latter may be recovered from the precipitated salt by mixing the salt with water, acidifying to, preferably, a pH of about 2.0, and precipitating the ether from the acid medium by the addition of a water-miscible alcohol or ketone as mentioned above. The pH of 2.0 is not critical and precipitation of the ether may be effected at other acid pH values. However, the highest yields of the free ether have been obtained by precipitation at pH 2.0.

The dextran carboxymethylated may be obtained in various ways but is preferably biosynthesized from sucrose using microorganisms of the *Leuconostoc mesenteroides* or *L. dextranicum* types, or their enzymes. Microorganisms which may be used include those bearing the following NRRL (Northern Regional Research Laboratory) designations: *Leuconostoc mesenterodies* B–512, B–119, B–1146, B–1190, B–742, B–1191, B–1196, B–1208, B–1216, B–1120, B–1144, B–523; *Streptobacterium dextranicum* B–1254 and *Betabacterium vermiforme* B–1139.

The dextran is produced by introducing a culture of the microorganism or the enzyme filtered from the culture into an aqueous sucrose-bearing nutrient medium, holding the mass until the dextran is synthesized in maximum yield, and then precipitating the dextran by the addition of a water-miscible aliphatic alcohol or ketone. The precipitated "native" dextran is purified by washing and reduced to a fine powder form for carboxymethylation. This "native" dextran is normally characterized by a very high molecular weight which has been calculated to be in the millions. It may be, and preferably is, carboxymethylated at the native high molecular weight to obtain the salt or free ether to be formed into the water-soluble film. However, films may also be formed from carboxymethyl dextran or the alkali metal salts thereof obtained by carboxymethylating a dextran having a molecular weight lower than that normally characteristic of microbiologically produced native dextran. Such dextran of relatively low molecular weight may be a native dextran microbiologically produced under special controlled conditions tending to yield a relatively low molecular weight product or it may be obtained by partial hydrolysis of the native high molecular weight dextran in any suitable way. In general, the dextran carboxymethylated to obtain the film-forming salt or free ether may have a molecular weight of 5000 to as high as about four million.

The dextran as produced may be inherently water-soluble, more difficultly water-soluble or substantially water-insoluble. A water-soluble film is desirable but the inherently difficultly soluble or substantially water-insoluble dextrans may be used since the carboxymethyl group is a solubilizing group. Thus, although native L.m. B-523 dextran, for example, is not readily water-soluble, the alkali metal salt of the carboxymethyl ether, and the free ether, thereof having a D.S. of 1.0 to 3.0 is soluble in water, the rate of solubility increasing with increase in the D.S. The rate of water-solubility of the films derived from dextran can be controlled and regulated not only by controlling the average D.S., but also by selection of the starting dextran from the large group of dextrans available.

The films are obtained by dissolving the carboxymethyl dextran or the alkali metal salt thereof such as sodium carboxymethyl dextran, in water, adding a suitable amount of a compatible plasticizer, and casting the "dope" thus prepared to form the film.

Plasticizers which may be used in varying amounts include glycerol, sorbitol, and other water-soluble or water-dispersible plasticizers or softening agents such as certain of the glycol derivatives. Mixtures of the plasticizers may be used, such as mixtures of glycerol and sorbitol in varying proportions. The amount of plasticizer present in the casting dope may vary. In general, a total proportion of plasticizer between 30 to about 100 parts thereof per 100 parts of the carboxymethyl dextran or water-soluble carboxymethyl dextran is used.

The following examples are illustrative of specific embodiments of the invention, it being understood that these examples are not intended as limitative.

Example I

An aqueous casting dope is prepared by mixing 5.0 gms. of carboxymethyl dextran (derived from L.m. B-512 native, high molecular weight unhydrolyzed dextran and containing an average of 1.0 carboxymethyl group per anhydroglucopyranosidic unit of the dextran), and 3.0 gms. of glycerol with water to obtain a homogeneous "dope." The dope is spread on a polished steel plate and allowed to dry in air at about 25° C. On evaporation of the water, a thin, clear film remains, and can be peeled without disruption from the casting surface. This film is plastic, has commercially acceptable strength, and is soluble in water.

Example II

An aqueous casting dope is prepared by mixing 5.0 gms. of carboxymethyl dextran (derived from L.m. B-523 high molecular weight, native, unhydrolyzed dextran and containing an average of 2.8 carboxymethyl groups per anhydroglucopyranosidic unit of the dextran) and 3.0 gms. of sorbitol in water to obtain a homogeneous, syrupy dope. The dope is cast to a film as in Example I and dried in air at room temperature.

Example III

A casting dope is prepared by mixing 3.0 gms. of the sodium salt of the carboxymethyl dextran of Example I and 3.0 gms. of glycerol with water. The dope is cast to a film as in Example I and dried. The film has commercially acceptable physical properties in the dry state and is water-soluble.

Other water-soluble salts of the carboxymethyl dextrans may be formed into films as in Example III including the ammonium, magnesium, triethylamine, diisopropyl amine, diisobutylamine, ethylenediamine, 1,2-propylenediamine, hexamethylenediamine, ethanolamine, benzyldimethylamine and benzyltrimethylammonium hydroxide salts. However, when a film of carboxymethyl dextran salt is desired, for purposes of economy it is preferred to use the sodium or potassium salts as produced intitially in the carboxymethylating reaction, and usually the sodium salt is used since the reaction of the dextran and carboxymethylating agent is generally carried out in the presence of sodium hydroxide, resulting in production of the sodium salt of the ether.

The water-soluble films of the invention may be used for packaging materials of the kind already mentioned herein, and also for packaging solid particulate materials and non-aqueous liquids used in treating soil or plants and applied by implantation in the soil. The slow dissolution of the film by moisture in the soil or applied to it controls the rate at which the active soil or plant treating agent becomes available and, also, the dissolved carboxymethyl dextran or salt exerts a conditioning effect on the soil, tending to cause aggregation thereof into small loose agglomerates so that the soil becomes more porous and workable.

Various changes and modifications may be made in details in practicing the invention without departing from the spirit and scope of this disclosure or of the invention. It is to be understood, therefore, that it is not intended to limit the invention except as defined in the appended claims.

What is claimed is—

1. In combination, a particulate solid material for soil conditioning, said particles being packaged in a water-soluble protective film and which film consists essentially of a thin, flexible, water-soluble film composed essentially of a dextran film-forming constituent selected from the group consisting of carboxymethyl dextran containing an average of 1.0 to 3.0 carboxymethyl groups per anhydroglucopyranosidic unit, and water-soluble salts of said carboxymethyl dextran, said dextran film-forming constituent being plasticized by the addition of glycerol.

2. In combination, a particulate solid material for soil conditioning, said particles being packaged in a water-soluble protective film and which film consists essentially of a thin, flexible, water-soluble film composed essentially of a dextran film-forming constituent selected from the group consisting of carboxymethyl dextran containing an average of 1.0 to 3.0 carboxymethyl groups per anhydroglucopyranosidic unit, and water-soluble salts of said carboxymethyl dextran, said dextran film-forming constituent being plasticized by the addition of glycerol, said carboxymethyl dextran and glycerol being present in a proportionate amount by weight of plasticizer between 30 and about 100 parts per 100 parts of the carboxymethyl dextran.

References Cited in the file of this patent

UNITED STATES PATENTS

| Number | Name | Date |
|---|---|---|
| 1,367,725 | Trigg | Feb. 8, 1921 |
| 2,089,217 | Mahoney | Aug. 10, 1937 |
| 2,091,993 | Jones | Sept. 7, 1937 |
| 2,218,592 | Taylor | Oct. 22, 1940 |
| 2,518,135 | Gaver | Aug. 8, 1950 |
| 2,539,395 | Banks | Jan. 30, 1951 |
| 2,558,042 | Cornwall | June 26, 1951 |
| 2,671,779 | Gaver et al. | May 9, 1954 |
| 2,722,311 | Morrison | Nov. 1, 1955 |
| 2,749,277 | Toulmin | June 5, 1956 |
| 2,756,160 | Novak et al. | July 24, 1956 |
| 2,780,888 | Novak et al. | Feb. 12, 1957 |
| 2,785,977 | Novak | Mar. 19, 1957 |
| 2,789,915 | Bishop | Apr. 23, 1957 |
| 2,790,721 | Toulmin | Apr. 30, 1957 |

FOREIGN PATENTS

| | | |
|---|---|---|
| 517,820 | Great Britain | Feb. 9, 1940 |

OTHER REFERENCES

"Nature," Feb. 6, 1954, page 237.